Oct. 27, 1964 A. F. MARTIN 3,154,473
APPARATUS FOR PRODUCING CONTROLLABLE SLOW
NEUTRON CHAIN REACTION
Filed March 7, 1958 8 Sheets-Sheet 1

FIG. 1

ARTHUR F. MARTIN
*INVENTOR.*

BY Ernest G. Peterson
AGENT

FIG. 2

ARTHUR F. MARTIN
*INVENTOR.*

BY  *Ernest G. Peterson*

AGENT

FIG. 3

ARTHUR F. MARTIN
INVENTOR.

BY Ernest G. Peterson
AGENT

ARTHUR F. MARTIN
INVENTOR.

Oct. 27, 1964

A. F. MARTIN 3,154,473

APPARATUS FOR PRODUCING CONTROLLABLE SLOW
NEUTRON CHAIN REACTION

Filed March 7, 1958

ARTHUR F. MARTIN
INVENTOR.

BY Ernest G. Peterson

AGENT

FIG. 11

ARTHUR F. MARTIN
INVENTOR.

BY Ernest G. Peterson
AGENT

Oct. 27, 1964 A. F. MARTIN 3,154,473
APPARATUS FOR PRODUCING CONTROLLABLE SLOW
NEUTRON CHAIN REACTION
Filed March 7, 1958 8 Sheets-Sheet 8

FIG. 12

ARTHUR F. MARTIN
*INVENTOR.*

BY Ernest G. Peterson

United States Patent Office 3,154,473
Patented Oct. 27, 1964

3,154,473
APPARATUS FOR PRODUCING CONTROLLABLE
SLOW NEUTRON CHAIN REACTION
Arthur F. Martin, Hockessin, Del., assignor to Hercules
Powder Company, Wilmington, Del., a corporation of
Delaware
Filed Mar. 7, 1958, Ser. No. 719,820
27 Claims. (Cl. 176—37)

This invention relates to the general subject of nuclear fission. It also relates to apparatus and processes for the generation and utilization of nuclear energy through the creation and maintenance of a critical mass of fissionable material and thereby a controlled chain reaction of nuclear fission.

More particularly, this invention relates to apparatus and processes for the generation and utilization of nuclear energy in which substantially all of the fissionable material in the critical mass exists as a powder suspended in and moving with a gas, the gas serving to carry away a substantial portion of the energy released upon fission. It also relates to apparatus and processes for the generation and utilization of nuclear energy wherein there is direct utilization of the fission fragment energy to cause chemical reaction in the gas in which the fissionable material is suspended.

Ever since the first successful operation of Chicago Pile-1 in 1942 it has been known that atoms which fission when struck with neutrons can be formed in suitable quantities and geometry into a critical mass within which a self-sustaining chain reaction occurs and large amounts of energy are liberated. The theories and facts concerning the fission of atomic nuclei are well developed and encompass such factors as:

(1) The number of neutrons liberated per fission nucleus.

(2) The speed of the neutrons and the methods for slowing them down (moderating them) in order to cause their absorption in other fissionable nuclei and to result in further fission.

(3) The control of neutron losses and of excess reactivity, and (4) The selection of elemental isotopes which will undergo neutron fission and the like.

By utilizing these theories and facts there have been developed nuclear reactors which may be classified as "slow," "intermediate" and "fast" where these terms refer to the average speed of the neutrons at the time of reaction with the fissionable nuclei. Another means of classification of nuclear reactors is by homogeneous and heterogeneous types, the former referring to reactors in which the fissionable material is dissolved in a liquid and the latter referring to reactors in which the fissionable material is particulate and solid and is at least partially interspersed with zones containing no fissionable material. A description of some embodiments of heterogeneous fixed fuel reactors is given in U.S. Patent 2,708,656, issued to Fermi et al. on an application filed December 19, 1944, and assigned to U.S. Atomic Energy Commission. Many other nuclear reactor concepts have formed the basis of patent applications filed between 1944 and the present time.

Much effort has been expended in adapting the principles of nuclear reactor design to the problem of making economical use of nuclear energy for peace-time purposes. For example, in England several power stations have been built and are being built which involve the use of gas-cooled ($CO_2$), slow-neutron reactors using fixed fuel elements of natural uranium encased in magnesium metal and using graphite encased in magnesium metal as the moderator for slowing down the fission neutrons. These stations are said to be economical in England where power costs are high due to the scarcity of coal and other conventional fuels. However, these reactors are expensive to build and to operate. The thermal efficiency of the steam generated is dependent upon the temperature of the reactor-coolant gas, and this is limited severely by the use of magnesium metal as part of the reactor. In fact, magnesium metal will react chemically with the gas ($CO_2$) at temperatures only slightly above those for which the reactor is designed to operate (336°C.). In addition, the fixed fuel elements have a tendency to warp and sag as a result of irradiation damage and the temperature employed. Further, the fuel is in the form of uranium metal which must at intervals be dissolved, processed to remove fission products and plutonium, and refabricated back to uranium metal—an expensive process. Finally, the use of natural uranium means that the core of the reactor must be very large in order to achieve a critical mass and to maintain a chain reaction. The size of the core constitutes a limit on the pressure to which the containing vessel may be subjected and this low pressure affects adversely the heat exchange characteristics of the reactor and of the steam generator.

In the U.S. numerous demonstration reactors for the production of power have been proposed and built without any claim that these particular reactors are economical for power generation. Most of these reactors are of a heterogeneous fixed fuel element type, although use is normally made of partially enriched uranium in order to reduce the amount of uranium needed to make a critical mass.

Then, too, liquid cooling is in general more highly favored than gas cooling, primarily because of more favorable heat exchange characteristics in the reactor. However, liquid cooling generally encounters one or more of these problems—the necessity of using high pressure to maintain the liquid state, low temperatures at the exit from the reactor core, corrosion, and radiation damage to the coolant.

A few proposals involve the use of homogeneous reactors. In one type of homogeneous reactor uranyl sulfate or phosphate is dissolved in light or heavy water. In another, uranium metal is dissolved in molten bismuth and the reactor is operated at high temperature. The former type of reactor was designed to operate only at very low power levels and it is believed not to be practical for power production. In the latter type of reactor two severe difficulties have been incurred. First, the operating temperature range must be narrowly controlled such that it is high enough to dissolve the required quantity of uranium and yet low enough that corrosion of materials of construction can be minimized. Secondly, the conversion of bismuth through neutron absorption to polonium creates enormous quantities of dangerous alpha-radiation.

It can thus be seen that the conventional types of nuclear reactors have practical limitations which at the present stage of their development prevent them from being practical and/or economical when used solely for power generation. In addition, none of these reactors can be operated so that a major portion of its energy output can be used directly for chemical synthesis nor can these reactors be easily converted to such operation and production.

It is accordingly one of the objectives of this invention to provide an apparatus for the generation and utilization of nuclear energy which is less expensive to build and operate than the conventional nuclear reactors using fixed fuel elements. Thus, it is desired to provide such an apparatus which avoids the following problems by avoiding the use of fixed fuel elements: the warping and sagging of fuel elements as a result of irradiation damage, the resultant changes in coolant circulation, the chemical processing of fuel elements to remove fission products and plutonium and refabrication of the elements, and the problems associated with carefully machined channels and other devices for supporting fixed fuel elements in exact geometry within the reactor core.

Another object is to provide an apparatus and process for the generation and utilization of nuclear energy wherein the fissionable material is in the form of a dust or powder suspended in a coolant gas and where the gas serves to carry away a substantial portion of the energy released upon fission, which energy can be recovered in a suitable heat exchanger and converted to power.

Still another object of this invention is to provide an apparatus and process for the generation and utilization of nuclear power wherein there is direct utilization of the kinetic energy of the direct or primary fission particles (referred to herein as "fission fragment energy") to cause chemical reaction in the gas phase in which the fissionable material is suspended.

It is still another object of this invention to provide an apparatus and process for the generation and utilization of nuclear power which makes possible the economical utilization of gamma rays and other reactor radiations to initiate desirable chemical reactions in the moderator portion of the nuclear reactor.

It is yet another object of this invention to provide a process and apparatus for the generation and utilization of nuclear energy in which it is possible to obtain greater thermal efficiency in the conversion of the energy to steam due to the fact that there is no severe limitation on the temperature of the coolant as there is in the case of all of the conventional reactors discussed above.

It is also an object of this invention to provide an apparatus for the generation and utilization of nuclear power which involves a comparatively small core where the majority of the fissioning of the fuel takes place such that comparatively high pressures can be employed in the operation of the apparatus with attendant improvement in the heat exchange characteristics of the system.

Another object is to provide a process for the generation and utilization of nuclear energy which makes possible the use of uranium compounds such as one of the oxides of uranium rather than uranium metal. The attainment of this objective provides an economic advantage since the step of converting uranium oxide to the metal is eliminated.

Finally, it is an object of this invention to provide an apparatus for the generation and utilization of nuclear power wherein only fast and slow neutrons will ever contact the fissionable material in significant amounts and where intermediate speed neutrons will not be present in significant amount so that the problem of resonance capture of neutrons of intermediate speed by $U^{238}$ will be almost entirely avoided. It is also the closely related objective of the invention to retain the feature of good control and safe operation which is characteristic of slow neutron reactors in comparison with fast neutron reactors.

Generally described, the present invention is a neutronic reaction system for producing a controllable slow neutron chain reaction, which system comprises a reactor core containing a critical mass of fissionable material suspended as a powder in a coolant gas, a moderator substantially surrounding the reactor core, a plurality of heat exchangers located exteriorly of the reactor core and moderator, conduit means connecting the reactor core with each heat exchanger for the passage of the suspension of fissionable material from the reactor core to the heat exchangers, return conduit means from each heat exchanger to the reactor core for returning the suspension of fissionable material from the heat exchanger to the reactor core, means in each reactor core-heat exchanger circuit in which the suspension of fissionable material is circulated for continuously cycling the suspension of fissionable material therein and throughout the system, means for addition of fissionable material and coolant gas to the system, and means for removal of fissionable material and fission products from the system for processing.

In accordance with the preferred embodiment of the invention there is employed essentially the same combination of elements as just described and additionally a plurality of fissionable material removal means located exteriorly of the reactor core but within the moderator. Also, in place of conduit means connecting the reactor core with each heat exchanger for withdrawing the suspension of fissionable material from the reactor core to the heat exchangers there are employed (a) conduit means connecting the reactor core with each of the aforesaid fissionable material removal means for the passage of the suspension of fissionable material from the reactor core to the fissionable material removal means, and (b) conduit means from each of said fissionable material removal means to one of said heat exchangers for the passage of coolant gas from which fissionable material has been removed to said heat exchanger. Then, the return conduit means in the preferred embodiment are employed for returning the coolant gas from each heat exchanger along with the fissionable material previously separated therefrom in the fissionable material removal means back to the reactor core.

Also included in the present invention is a process for producing a controllable slow neutron chain reaction which comprises continuously forming in a fission zone a critical mass of fissionable material which is suspended as a powder in a coolant gas. The fast neutrons formed in the fission zone are continuously moderated by use of a moderator in a moderating zone substantially surrounding the fission zone. A plurality of streams of suspended fissionable material are continuously withdrawn from the fission zone. Each stream of suspended fissionable material is continuously subjected to heat exchange in one of a plurality of heat exchange zones where energy from the fission is removed as heat. The conditions in each heat exchange zone are such that a critical mass of fissionable material does not exist therein during operation of the process. Each of the streams of suspended fissionable material is continuously recycled back to the fission zone.

It is preferred to continuously substantially remove the fissionable material from each of the streams of fissionable material within the moderating zone but outside of the fission zone. Then, after subjecting each of said streams from which fissionable material has been removed to heat exchange in one of a plurality of heat exchange zones the coolant gas is continuously recycled from each heat exchange zone along with fissionable material previously separated therefrom in the aforesaid removal step back to the fission zone.

The system of the present invention may be applied in various forms of apparatus of which two main forms and several modifications thereof are illustrated in the accompanying drawings in which—

Various other modifications and adaptations of my apparatus and system will be apparent as this description proceeds.

Figure 1:
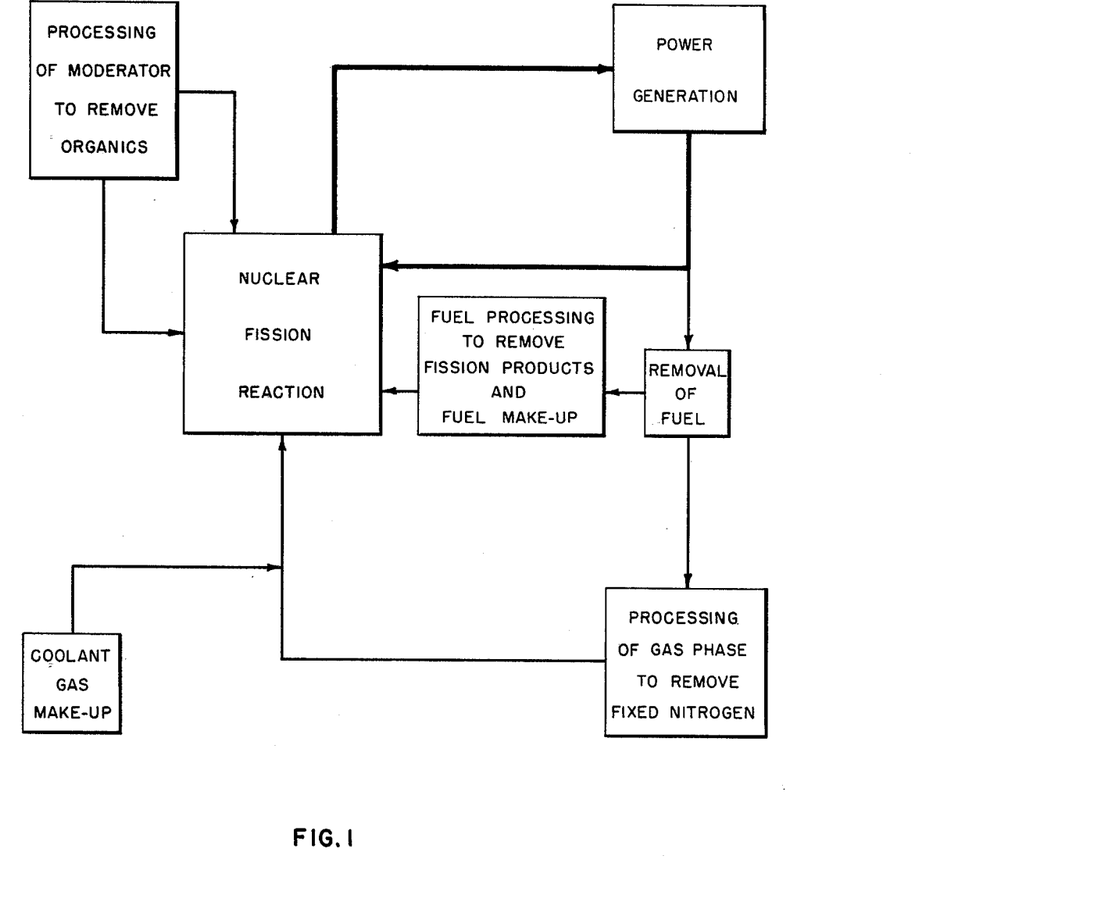
FIG. 1 is an overall flow diagram showing the various processes which are involved in the operation of the instant neutronic reaction system and the interrelation thereof.

Referring to FIG. 1 of the drawings, this represents an overall flow diagram showing the various processes which are involved in the operation of the subject neutronic reaction system. It may be regarded as showing three different cycles. The central point of the diagram is a nuclear reactor in which large amounts of heat are generated as a result of nuclear fission and in which various types of energy, mainly fission fragment energy, are used to effect a desired chemical reaction in the gas phase. The fixation of nitrogen may be mentioned as illustrative of such a chemical reaction. Thus, in the upper right-hand corner of the figure there is depicted the power generation cycle wherein a suspension of fissionable material or fuel is constantly circulated between the reactor and heat exchangers where the heat is abstracted from the circulating suspension of fissionable material and converted into power. In the lower right-hand corner of the figure there is depicted the processing of a portion of the stream of suspended fissionable material, which processing involves first the removal of solid fissionable material, the processing thereof to remove fission products and the recycling of the resulting material along with any makeup fissionable material back to the reactor, and, second, the processing of the gas phase remaining after the separation of the fissionable material for the purpose of recovering fixed nitrogen therefrom. The unreacted gas along with coolant gas makeup is recycled back to the nuclear reactor. Up in the left-hand corner of the figure there is depicted the cycle involving the cycling of liquid organic moderator from the moderating zone surrounding the core of the nuclear reactor to a processing step where organic reaction products, resulting mainly from gamma ray initiation, are removed and the resulting purified liquid organic moderator is recycled back to the moderating zone.

Referring to FIGS. 2–5 of the drawings, these figures illustrate a preferred embodiment of the neutronic reactor system of this invention. In this preferred embodiment a plurality of cyclones (48 in all) is employed to remove substantially the fissionable material from the streams of suspended fissionable material which are withdrawn from the top of the reactor core 10 so that only a small proportion of the fissionable material withdrawn from the reactor core goes into the heat exchangers 11. Thus, referring especially to FIG. 3 and to FIGS. 2, 4 and 5 as necessary, blowers mounted under heat exchangers 11 force coolant gas from the heat exchangers into pipes 12 and from there into manifolds 13, there being one manifold for each heat exchanger. From each manifold the coolant gas is forced through eight smaller lines 14 each of which contains a venturi. Each of said venturis is in communication at the throat with the solids exit from a cyclone 15 (described infra). The coolant gas in passing through said venturis withdraws a thickened suspension of fissionable material such as, for example, uranium trioxide ($UO_3$) from the bottom of the cyclone and as a result of the turbulent flow the fissionable material becomes uniformly dispersed or suspended in the coolant gas. Preferably, the uranium in the uranium oxide is at least 20% enriched as respects its $U^{235}$ content. The smaller lines 14 communicate with twelve L's 16 in the bottom of the reactor core 10, each L having four lines connected thereto. The suspension of fissionable material thus passes from the smaller lines into the L's and thence into the reactor core.

Figure 3:
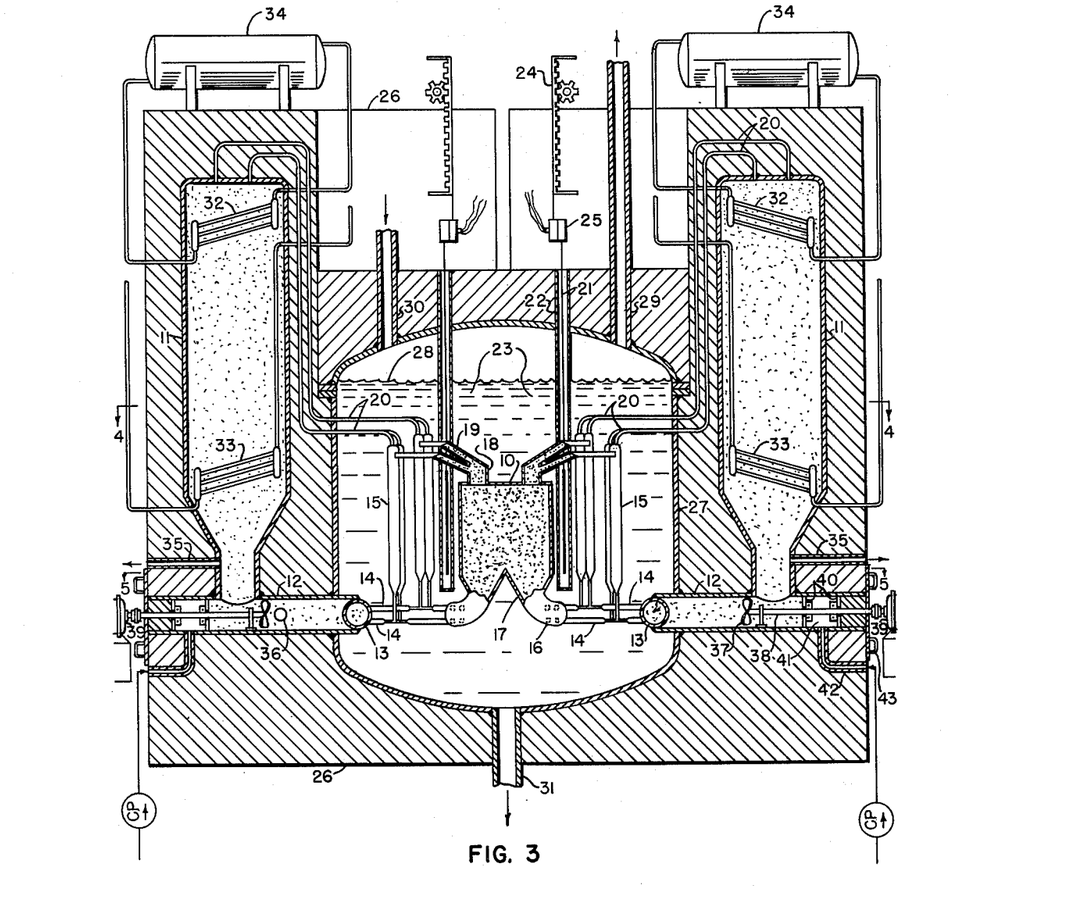
FIG. 3 is a cross-section of the preferred embodiment of the neutronic reaction system taken along the line 3—3 of FIG. 2.
Figure 5:
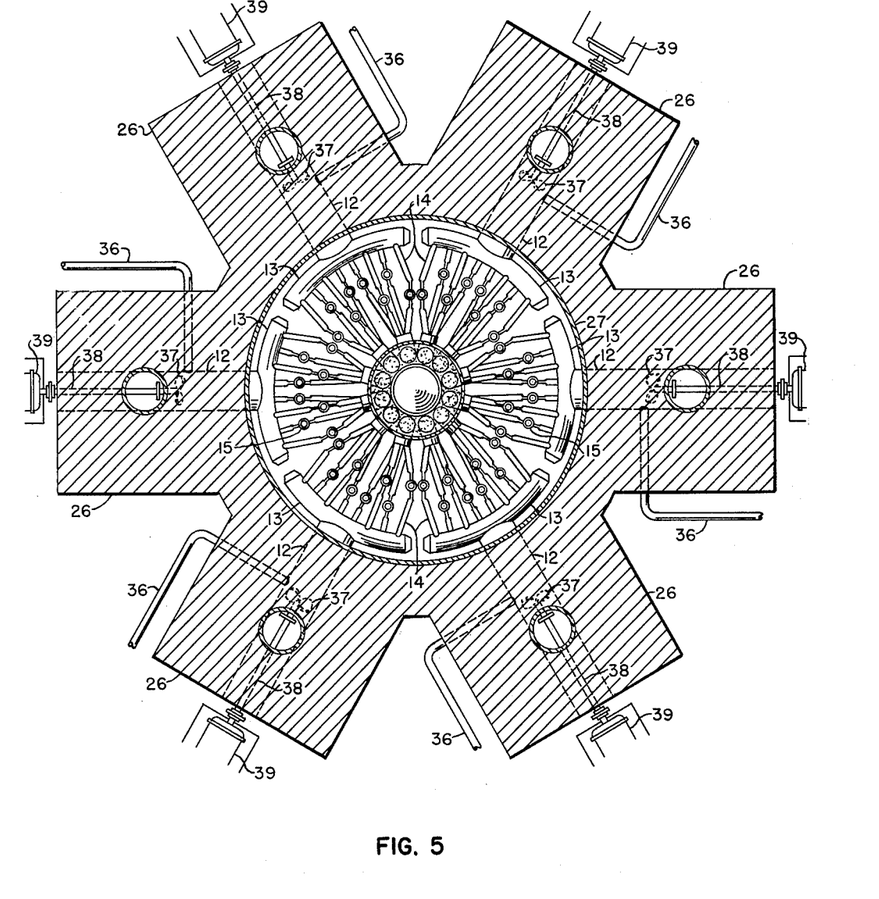
FIG. 5 is a cross-section of the preferred embodiment of the neutronic reaction system taken along the line 5—5 of FIG. 2. This particular figure shows the detail respecting the manifolds and the connective piping to the reactor core of the preferred embodiment.

The reactor core is constructed essentially in the form of a cylinder. The bottom of the core comprises a conical section 17 and the twelve L's 16 referred to above, all of which are joined together and to the cylindrical body of the reactor core in fluid-tight relationship as shown in FIGS. 3 and 5. Six main conduits 18 are joined to the top of the reactor core. The reactor core is so constructed that it is fluid-tight except for the forty-eight inlets into the L's in the bottom and the six main conduits in the top. Each one of these main conduits divides into eight separate smaller lines 19 and each of said smaller lines connects with the inlet of a gas-solids cyclone separator 15. From the gas exits from the cyclones lines 20 lead to the tops of heat exchangers 11.

The suspension of uranium oxide enters the reactor core through the L's 16 as mentioned above. In the reactor core sufficient uranium oxide is brought together to form a critical mass and to sustain a chain reaction. Control rods 21 extending into wells 22 in the moderating zone 23 at zones of maximum slow neutron flux are used to prevent reactor excursions and to control the operation of the reactor so that the proper multiplication factor obtains. This is defined as the ratio of the number of neutrons of any one generation to the number of the immediately preceding generation. The control rods may be operated from outside of the shield 26 by a suitable device such as a rack and pinion designated as 24. At 25 there is shown an electromagnetic control device which cna be set to drop the control rods quickly in the case of an emergency and thereby stop the chain reaction taking place in the reactor core.

The suspension of uranium oxide in the core is in turbulent flow and it is forced out through the conduits in the top of the core by the pressure from the blowers referred to above. The suspension passes from the main conduits 18 into the smaller lines 19 and thence into the inlets of the cyclone separators 15. The suspension of uranium oxide enters the cyclones with gas velocities such that a substantial portion of the uranium oxide in the gas is thrown out and downwardly to be recycled to the reactor core with the coolant gas from the heat exchangers. The largest part (approximately 90%) of the coolant gas entering into the cyclones emerges from the gas exits of the cyclones and passes through lines 20 to the heat exchangers. Under optimum conditions of operation the coolant gas will be freed from substantially all (say 80–90%) of the uranium oxide.

The recycle through cyclones 15 of substantially all of the uranium oxide (including with the uranium oxide the fission products formed therefrom) means that most of the delayed neutrons resulting from the fission are kept within the reactor tank 27 and the moderating zone 23. These delayed neutrons make a significant contribution to reactor control and help to reduce the size of the critical mass.

A reactor tank 27 substantially encloses the reactor core 10 which is located centrally therein. Within the reactor tank is a liquid moderator 28 which substantially surrounds the reactor core. The moderating zone is designated as 23 and comprises essentially all of the space occupied by the moderator. The liquid moderator may be water or an organic liquid as, for example, heavy water, terphenyl, methanol, and so forth. Heat which is generated in the moderating zone by the slowing down of the fast neutrons and the absorption of gamma rays is removed by refluxing of the moderator. Thus, line 29 which communicates with the top of the reactor permits vapors of the liquid to be removed therefrom to a suitable condenser not shown and returned to the reactor through line 30. In the event gaseous products are formed by action of the reactor radiation on the moderator, such products can be, of course, removed from the vapors by fractional distillation. Line 31 in the bottom of the reactor tank is for the purpose of removing the moderator for processing either continuously or from time to time to remove chemicals produced as a result of gamma radiation and other reactor radiation. Solid moderators such as canned graphite can be used if desired. There are, however, certain advantages in the use of a liquid moderator as, for example, the automatic temperature control as described above.

Although not shown in these FIGS. 2–5, the reactor assembly consisting of lines 13, 14, 16, 18, 19 and lines 20 to the extent that they are within the reactor tank, reactor core 10, and cyclones 15 is made of double wall construction with suitable thermal insulation of low neutron-absorbing characteristics such as magnesium oxide between the walls to keep heat transfer between the interior of this assembly and the moderating zone to a minimum. The gas in the space between the double walls is continuously monitored for leaks, either from within the assembly or from the moderator. In spite of the thermal insulation between the reactor assembly and the moderating zone 23, some heat is transferred and in addition a major part of the gamma and neutron energy is absorbed by the liquid moderator. This heat is removed by vaporizing the liquid through pipe 29 into an external circuit as described above.

The hot gases from lines 20 which may and probably will contain residual uranium oxide dust flow downwardly through a plurality of heat exchangers 11 in which steam is generated in boiler tubes, superheater tubes and economizer tubes represented by 32 and 33. The tubes 32 are shown communicating with a steam drum 34 in accordance with the usual practice. The cooled gases flow to pipes 12 which are joined to the bottoms of the heat exchangers where they are picked up by the blowers and recycled back to the reactor core.

The reactor tank 27, the heat exchangers 11 and the blowers and connective pipes are surrounded by biological shields 26 which are of conventional design and consist of a multiplicity of layers of boron, lead, iron, densified concrete and the like.

The blowers used may be any of several types and the ones shown here are merely illustrative. The blowers are shown installed in pipes 12 in such a manner as to provide for safety of operation and ease of access for maintenance. Thus, each blower comprises a fan 37, a shaft 38 and a motor 39 for powering the fan. The shaft is located axially within pipe 12 with the fan between manifold 13 and the exit from the heat exchanger 11. Two metal discs 40 are sealed in pipe 12. They have holes located centrally thereof to accommodate the fan shaft 38 and are equipped with stuffing boxes so that the resulting compartment 41 is essentially gas-tight. When the reactor is in operation an inert gas or liquid is forced into the compartment through line 42 and maintained therein at a pressure above the pressure within the reactor so that there can be no leakage of coolant gas which may contain radioactive components out into the atmosphere. A cover plate 43 can be removed to gain access to the interior blower structure.

From one or more of the heat exchangers 11 a gas purge line 35 leads to an external processing circuit (not shown) which may, for example, comprise cyclones and filters for removing the last traces of uranium oxide and equipment for the recovery of chemicals when the reactor is being used for chemical production in the gas phase by utilization of fission fragment energy in the reactor assembly. Also, this processing circuit may contain equipment for the removal of gaseous fission product poisons which result from the continuous fission taking place in the reactor core and to a lesser extent in other parts of the reactor assembly. All or a portion of the uranium oxide recovered from this purge stream may be processed to remove fission products and to recover usable uranium oxide. Any recovered coolant gas and any make-up coolant gas required for the operation may be fed into the system through line 36 along with any recovered uranium oxide and any makeup uranium oxide. A suitable solids feeder (not shown) and a blower (not shown) are required for this purpose.

Figure 2:
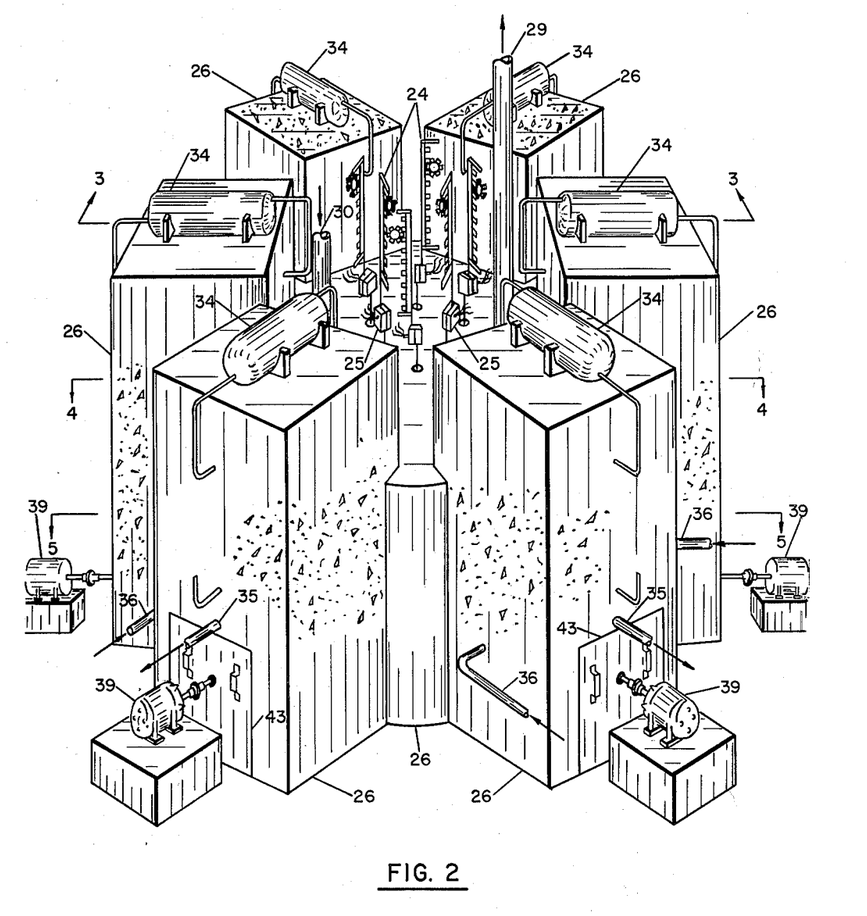
FIG. 2 is a perspective view of a preferred embodiment of the neutronic reaction system of this invention completely enclosed in a radiation shield.
Figure 4:
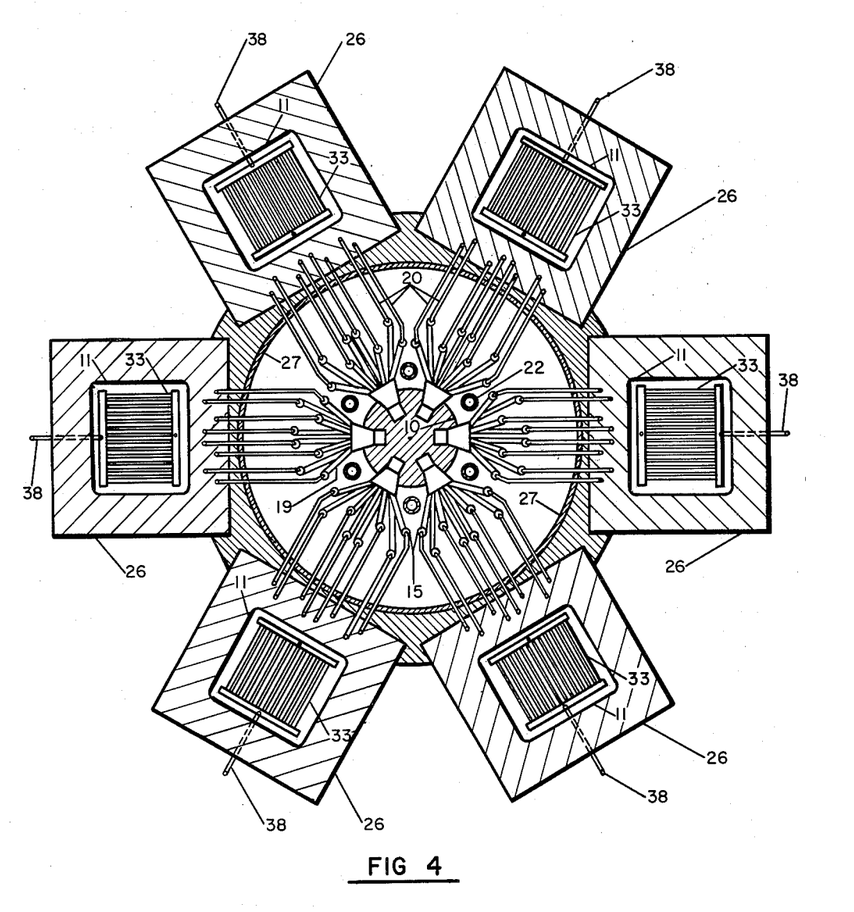
FIG. 4 is a cross-section of the preferred embodiment of the neutronic reaction system taken along the line 4—4 of FIG. 2. This particular figure shows the detail respecting the manifolds and connective piping to the reactor core.

It is apparent, particularly in view of FIGS. 2, 4 and 5, that the preferred embodiment shown has six distinct suspension circulating systems including a heat exchanger for each such system. It will be understood that this represents merely a convenient geometry making a reasonably compact arrangement with three sides of each heat exchanger available for maintenance. In general, there will be two or more suspension circulating systems and two or more heat exchangers associated with each reactor core so that the fissionable material will be divided between the heat exchangers and no heat exchanger will contain enough fissionable material to create a critical mass. There may obviously be more than the illustrated six suspension circulating systems and associated heat exchangers.

Figure 9:
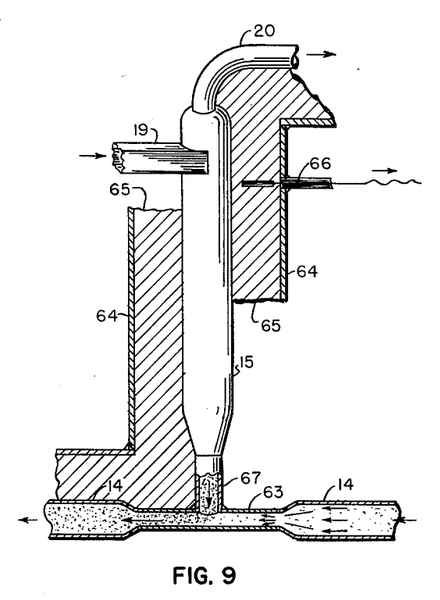
FIG. 9 is a vertical-section, partly in elevation, of one of the cyclones of the preferred embodiment shown in FIG. 3.

FIG. 9 is an enlarged view of one of the cyclones 15 of the preferred embodiment which is shown partly in elevation and partly in section. The suspension of fissionable material from the reactor core enters the cyclone through line 19 and the coolant gas from which the fissionable material has been substantially removed exits through line 20. In the cyclone a substantial amount of the fissionable material is removed from the gas which proceeds through line 20 to the heat exchangers. The removed fissionable material concentrates in the bottom of the cyclone in the form of a dense suspension which is removed therefrom by the coolant gas being recycled to the reactor core 10 through line 14 from the heat exchanger. As shown in the figure the solids exit 67 from the cyclone communicates with the throat of a venturi 63 in line 14. This particular construction is the preferred form of construction for joining the solids exit from the cyclone to the recycle line from the heat exchanger. However, other means may be employed if desired. This figure also shows the double wall construction described above with reference to the reactor assembly. Thus, the outer walls of the construction are shown as 64, the insulation between the walls as 65 and a thermocouple 66 is shown for determining the temperature between the walls.

Figure 11:
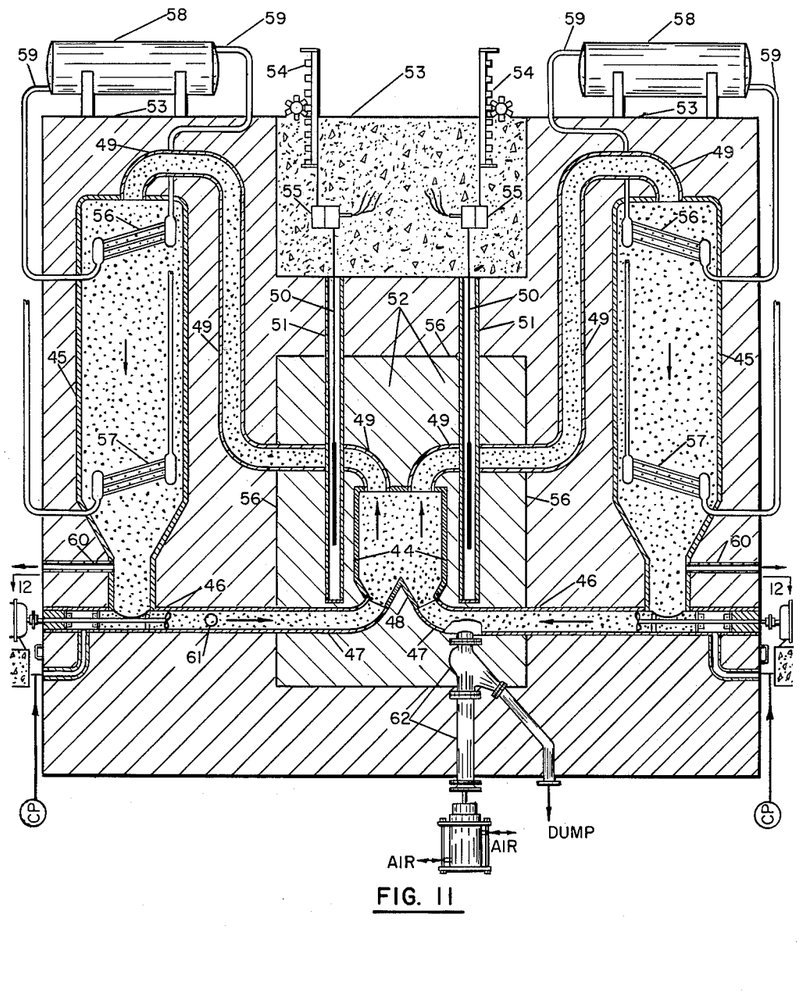
FIG. 11 is a vertical-section of another embodiment of the neutronic reaction system of the invention.
Figure 12:
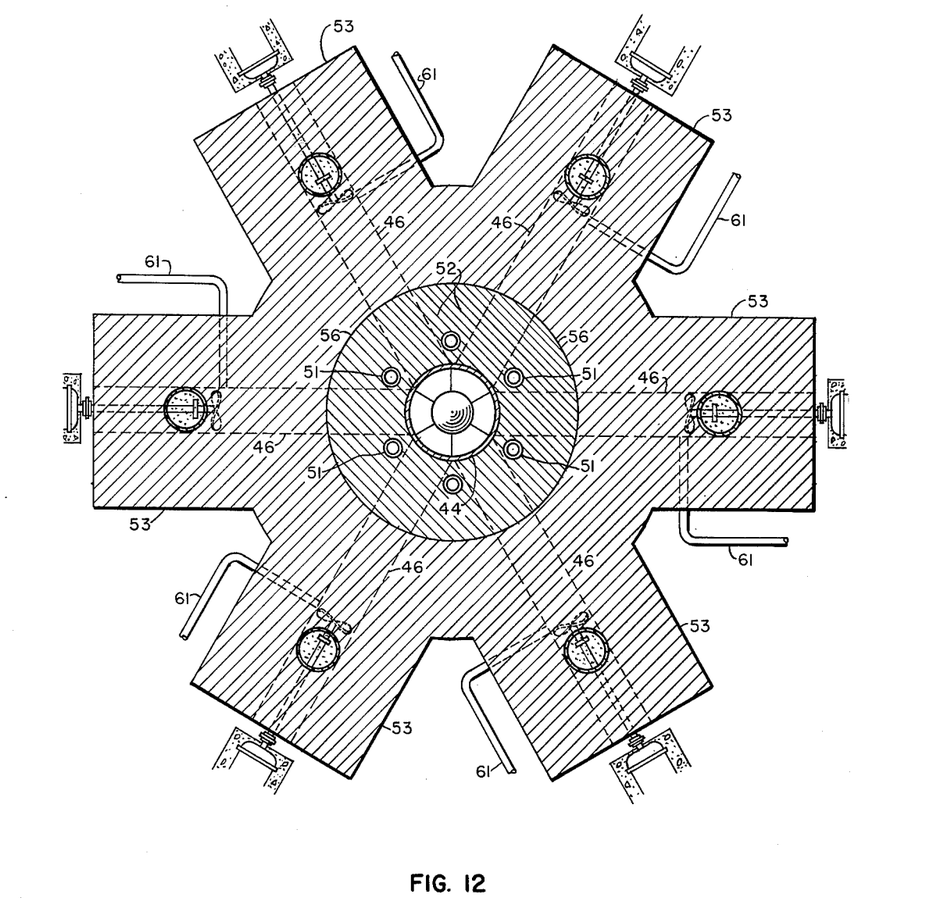
FIG. 12 is a cross-section of said other embodiment of the neutronic reaction system taken along the line 12—12 of FIG. 11.

Referring to FIGS. 11 and 12 of the drawings, these figures illustrate another embodiment of the neutronic reactor system of this invention. In this embodiment the uranium oxide dust from the reactor core 44 is continuously passed through the heat exchangers 45 instead of being removed to a substantial extent in cyclones as in the preferred embodiment given in FIGS. 2–5. Thus, referring especially to FIG. 11 and to FIG. 12, as necessary, blowers mounted under heat exchangers 45 force a suspension of fissionable material such as, for example, uranium trioxide ($UO_3$) through pipes 46. These pipes communicate with L's 47 in the bottom of the reactor core 44, each L having a single pipe connected thereto. The suspension of fissionable material thus passes from the pipes into the L's and thence into the reactor core.

The reactor core is constructed essentially in the form of a cylinder. The bottom of the core comprises a conical section 48 and the six L's 47 referred to above, all of which are joined together and to the cylindrical body of the reactor core in fluid-tight relationship as shown in FIGS. 11 and 12. Six main conduits 49 are joined to the top of the reactor core and the reactor core is so constructed that it is fluid-tight except for the six inlets through the L's in the bottom and the six main conduits in the top. The six main conduits lead from the top of the reactor core to the tops of the heat exchangers 45.

The suspension of uranium oxide enters the reactor core through the L's 47 as mentioned above. In the reactor core sufficient uranium oxide is brought together to form a critical mass and to sustain a chain reaction. Control rods 50 extending into wells 51 in the moderating zone 52 at points of maximum slow neutron flux are used to prevent reactor excursions and to control the operation of the reactor so that the proper multiplication factor obtains. The control rods may be operated from outside of the shield 53 by a suitable device such as a rack and pinion designated as 54. At 55 there is shown an electromagnetic control device which can be set to drop the control rods quickly in the case of an emergency and thereby stop the chain reaction taking place in the reactor core.

The suspension of uranium oxide in the core is in a state of turbulence and it is forced out through the conduits in the top of the core by the pressure from the blowers referred to above. The suspension of uranium oxide passes from these main conduits 49 into the tops of heat exchangers 45.

A solid moderator 56 is shown as completely surrounding the reactor core. This solid moderator may be composed, for example, of canned graphite. The reactor core is located centrally in the solid moderator. The moderating zone is designated in FIG. 11 as 52 and it comprises essentially all of the space occupied by the moderator. Liquid moderators such as heavy water, terphenyl, methanol, and so forth, may be employed, as in the case of the preferred embodiment, in which case a reactor tank must be employed and it must be so constructed as to substantially enclose the reactor core.

A major part of the energy of the fast neutrons and gamma rays formed in the fission reaction will be absorbed by the moderator. Although not shown in FIGS. 11 and 12, a coolant system will normally be installed in the solid moderator to remove the neutron and gamma heat from the moderator section. This cooling of the moderator may be accomplished by any suitable means such as by coils which are connected with the system of the heat exchangers 45. In the event a liquid moderator is employed the heat will be removed by vaporizing the liquid into an external circuit containing a condenser and a return to the moderating zone as in the case of the preferred embodiment.

The hot streams of suspended uranium oxide from lines 49 pass downwardly through a plurality of heat exchangers 45 in which steam is generated in boiler tubes, superheater tubes and economizer tubes represented by 56 and 57. The tubes 56 are shown communicating with a steam drum 58 through lines 59 in accordance with usual practice. The cooled suspension of uranium oxide flows to pipes 46 which are joined to the bottoms of the heat exchangers where they are picked up by the blowers and recycled back to the reactor core.

The larger amount of fissionable material together with the fission products and delayed neutrons which will be associated with it will render heat exchangers 45 and the external recycle system, i.e., lines 46 and 49, very radioactive. It is essential, therefore, that these sections as well as the reactor core and its connective piping be surrounded by biological shields 53 which are of conventional design and consist of a multiplicity of layers of boron, iron, lead, densified concrete and the like. A dumping valve 62 is shown attached to one of the L's at the bottom of the reactor core for withdrawing uranium oxide from the system as in case of an emergency. This is described in greater detail below.

The blowers used may be any of several types and the type shown in FIGS. 11 and 12 is merely illustrative. It is the same as that utilized in connection with the preferred embodiment of FIGS. 2–5.

As in the case of the preferred embodiment of FIGS. 2–5, a gas purge line 60 leads from one or more of the heat exchangers 45 to an external processing circuit (not shown) which is essentially the same as the processing circuit described for the preferred embodiment. There will, however, be considerably larger proportions of fissionable material in the gas and that will have to be taken into account in the design of the equipment. Also, as in the case of the preferred embodiment, the six distinct suspension circulating systems employed in this embodiment merely represent a convenient geometry for reasonably compact arrangement with three sides of each heat exchanger available for maintenance. In general there will be two or more suspension circulating systems and two or more heat exchangers associated with each reactor core so that the fissionable material will be divided between the heat exchangers and no single heat exchanger will contain enough fissionable material to create a critical mass. A greater or lesser number may be used.

In the start-up of this neutronic reaction system the uranium oxide or a similar stable uranium salt is added as a dust through a solids feeder (not shown) into lines 61 which feed into pipes 46 until enough uranium oxide has been accumulated in the reactor recycle system consisting of the blowers, core 44, heat exchangers 45, and the piping associated therewith to form a critical mass. The side streams taken through pipes 60 will contain uranium oxide dust which will be removed from the side streams by cyclones, filters, and the like. A majority of this uranium oxide dust will be recycled back to the reactor directly, although a small portion will be withdrawn and processed to remove fission products to the extent that it is necessary.

It will be apparent from FIGS. 11 and 12 that the volume of any of the heat exchangers is larger than the volume of the reactor core. The drawings are, of course, for illustrative purposes only and this relationship need not exist in other embodiments of the invention. However, where this condition does exist there is a danger of having a critical mass of uranium oxide forming in any of the heat exchangers and it is necessary to take suitable precautions to prevent such formation. Thus, the interiors of the heat exchangers may be plated with neutron-absorbing materials such as cadmium. Similarly, control rods could be used therein, etc.

The following example is illustrative of the process of this invention as carried out in the neutronic reaction system of FIGS. 11 and 12.

In a nuclear reactor constructed essentially according to FIGS. 11 and 12, core 44 has a diameter of two meters and an effective height of four meters. The core is surrounded by a three-meter thickness of graphite in moderator zone 52. The core, the heat exchangers and the connective piping contain a mixture of $N_2$ and $O_2$ at a pressure of about 20 atmospheres and a temperature of about 600° C. The gas mixture is composed of 60% $N_2$ and 40% $O_2$ by volume and is substantially argon-free (about 0.1% argon). The gas is circulated by means of blowers so that an upward velocity of about 5 meters per second is maintained in core 44.

Uranium trioxide wherein the uranium is 40% enriched as respects its $U^{235}$ content and having a particle size averaging 5 microns in diameter is then introduced into the system through line 61 until the uranium oxide concentration is approximately 0.005 g./cc. in the core and elsewhere throughout the gas circulating system at which point the reactor goes critical. For uranium trioxide particles averaging 5 microns in diameter approximately 60% of the fission fragment energy is dissipated in the gas for a concentration of uranium oxide equal to 0.005 g./cc. of core. The energy dissipation in the gas first causes ionization of the gas molecules and reaction of $N_2$ and $O_2$ to nitrogen oxides and then appears as heat carried with the gas and removed in heat exchangers 45.

A stream of the suspended uranium oxide is continuously removed from one of the heat exchangers through line 60 and is processed in cyclones and filters (not shown) to remove essentially all particulate material. It is then taken to a catalytic converter and cooler where $N_2O_4$ is formed, is condensed, and is removed from the system. Radioactive carbon dioxide, of which the $C^{14}$ has been formed by neutron action on $N^{14}$ and $O^{17}$, is also removed in this operation. The residual noncondensible gas is recycled, along with makeup $N_2$ and $O_2$, to the reactor system through line 61. A small portion of the uranium oxide removed from the gas stream is processed to remove fission products. The remainder of the uranium trioxide plus makeup uranium trioxide is recycled to the reactor through line 61.

In FIGS. 2–5 and 11 and 12 the reactor core is shown as having an essentially cylindrical form. This form is satisfactory when it is desired to manufacture only one chemical in the reactor core at a time. However, when it is desired to manufacture more than one chemical simultaneously in the core, the core may be partitioned vertically to divide it into two or more parts with the limit being the number of fissionable material suspension circulation systems attached to the core, there being six such circulation systems in each of the embodiments described above. Where such a divided core is used, the peferred arrangement is to have each section of the core communicate with only one suspension circulation system. In this manner, the suspension of fissionable material that is circulating in any one circulation system is completely isolated from the suspension that is circulating in any one of the other circulating systems attached to the core. The fact that the fissionable material is thus separated while in the core does not prevent the attainment of a critical mass. Using this arrangement any desired chemical reaction may be carried out in the gas phase in any of the aforementioned circulating systems.

Figure 6:
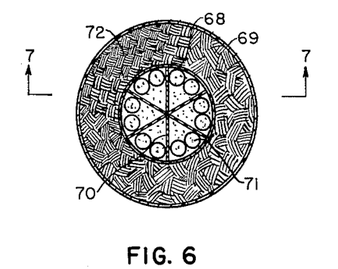
FIG. 6 shows a cross-section of a reactor core which differs from the reactor cores shown in either of the embodiments described above in that the core is partitioned vertically to divide it into six parts, one for each suspension circulating system. This section is taken along line 6—6 of FIG. 7.
Figure 7:
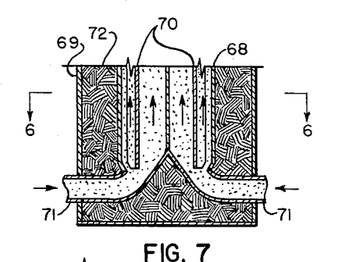
FIG. 7 is a vertical-section of the partitioned reactor core of FIG. 6 taken along the line 7—7 of FIG. 6.

Such a device is illustrated in FIGS. 6 and 7. In FIG. 6 there is shown a cross-section of a reactor core which is partitioned vertically to divide it into six parts, one for each of six suspension circulating systems. This section is taken along line 6—6 of FIG. 7. FIG. 7 is a vertical-section of such a partitioned core, this section being taken along the line 7—7 of FIG. 6. The reactor tank in this case is illustrated as 69, the core as 68 and the vertical partitions as 70. The inlet lines to the bottom of the reactor core are shown as 71. The direction of the suspension of fissionable material is indicated by the arrows in FIG. 7. Within the reactor tank and surrounding substantially the reactor core is a solid moderator 72 which may be, for example, canned graphite. When, as here shown, a solid moderator is employed, a reactor tank is not essential but merely optional. In this particular modification the core is partitioned into six different sections, each of which is in fluid-impervious relationship with each of the other sections of the core. This particular core can be used with either of the above-described embodiments of the neutronic reaction system of this invention.

Figure 8:
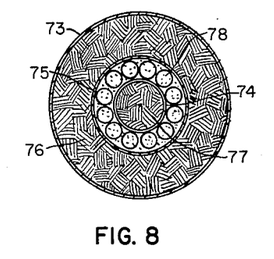
FIG. 8 is a cross-section of still another type of reactor core, this core being one in which the core is an annulus rather than essentially cylindrical as in the case of the cores shown in the preferred embodiment of FIGS. 2–5 and the core of FIGS. 11 and 12.

In FIG. 8 there is shown still another modification of the essentially cylindrical reactor core of the two main embodiments of the invention. In this modification the reactor core is in the form of an annulus. A cylindrical core represents convenient geometry for the core. However, there are certain advantages to the use of a core in the form of an annulus. Thus, this is the preferred geometry when the moderator outside the core contains elements which absorb neutrons and it is difficult to achieve a critical mass without using highly enriched uranium, a high concentration of uranium dust and/or a large core. When a core in the form of an annulus is used, a rod of low neutron absorbing moderator, such as graphite, encased in metal and located within the interior cylinder of the core can materially reduce the critical mass.

Thus, there is shown a cross-section of such a core in FIG. 8. The reactor tank is shown as 73, the exterior shell of the reactor core as 75 and the interior shell of the reactor core as 74. A solid moderator 76 as, for example, canned graphite, is employed in the space surrounding the exterior shell of the reactor core and within the reactor tank. Within the interior shell of the reactor core is a rod of graphite 77 encased in metal. The inlet lines to the bottom of the reactor core are shown as 78. The use of the reactor tank when a solid moderator is used is optional. This particular modification of the reactor core can be used with either of the above-described main embodiments of the invention.

Figure 10:
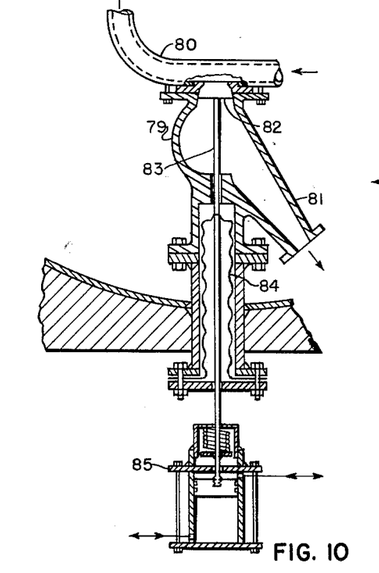
FIG. 10 is a cross-section of the dumping valve attached to an L in the bottom of the reactor core of FIG. 11.

In FIG. 10 there is shown a cross-section of a dumping valve which may be attached to one or more of the L's from the bottom of the reactor core in any of the above-described embodiments for the purpose of removing fissionable material rapidly from the reactor in an emergency. Such a valve is shown in position in FIG. 11. The flush bottom plug valve 79 is secured to the bottom of the L 80 such that the valve opening registers with a hole of suitable size in the L and provides communication between the valve and the interior of the L when the valve is in the open position. The valve comprises a discharge opening 81, a plug 82 which is secured to a stem 83. The bellows 84 serves to prevent leakage of the reactor contents past the valve stem. The valve is actuated by a compressed air device shown as 85 which is in fixed position with respect to the plug valve, so that on failure of the air supply or on signal the fissionable material may be dumped from the reactor into containers in which a chain reaction cannot be sustained.

In the above descriptions of the specific embodiments of this invention the heat exchangers shown are of the tube and shell type with the gas flow downwardly and perpendicular to staggered banks of the tubes. Other types of heat exchangers may be employed. The exact design will depend on heat transfer calculations on the pressures encountered on the gas and steam sides, on ease of maintenance and freedom from leaks, and on other factors. The main gas blowers which are associated with each of the heat exchangers are preferably mounted directly below the heat exchangers and within the biological shield. These blowers are the only moving parts in the gas circulation system of the neutronic reaction system and are preferably installed in duplicate to get better continuity of operation.

Cyclones have been employed in the preferred specific embodiments of the invention as the means of removing fissionable material from the streams of suspended fissionable material. Other removal means may be employed if desired. Cyclones designed to remove 90+% of fissionable material of density of about 8 grams per cc. and particle size averaging about 5 microns in diameter will be small in diameter, about 4 inches, and they will operate best at gas velocities of about 50 feet per second. Since the cross-sectional area in the cycline is so small a large number of cyclones will normally be required to handle the exit streams of fissionable material from the core. This is an advantage from a safety viewpoint since the cyclone acts to concentrate the fissionable material and thus tends to make a smaller critical mass. By separating the fissionable material through many cyclones the amount in any one cyclone can be made noncritical. It should be noted that the cyclones should be positioned far enough from the core to prevent an excess amount of fissioning from taking place in them but near enough that the delayed neutrons can make a contribution to reactor control. The cyclones are preferably positioned so as to effectively form an annulus of dilute uranium suspension surrounding the core and thus to make a maximum contribution toward reducing the overall critical mass.

The space between the double walls separating the core circuit from the moderator should be at lower pressure than either the core or the moderator, so that leaks from the core or moderator (if liquid) will go to this space. The space should be vented through filters and absorbers to remove radio activity. More destructive incidents, as well as leaks directly from the moderator to the shield, will best be handled with a gas-tight shell surrounding the reactor volume and direct working space. This is standard practice with reactors at the present time. The destructive incidents may take place as a result of excess criticality (to be controlled as indicated below) or a chemical combination of the radiation products.

The materials of construction of the core-cyclone-heat exchanger loops will be chosen (1) to prevent erosion by the fissionable material dust and (2) to prevent catalytic decomposition of the desired reaction products present in the gas phase such as the NO and $NO_2$ in the illustrative example. Corrosion will not be a problem since the gas will be bone-dry. Chrome steel (without nickel) is a preferable material, especially since chromium inhibits the catalytic effect of iron on nitric oxide decomposition. The use of 20% or more highly enriched fuel should make it possible to avoid magnesium and zirconium which have lower neutron cross-sections than iron and chromium but which have low melting points or phase changes. The moderator tank and the outer shell of the core loop may be constructed of steel or when necessary, clad steel. Control rods and shields will be of conventional materials.

The control and safety devices incorporated in the neutronic reaction system will be as follows. First, the reactor should have a negative temperature coefficient with higher temperatures expanding the gas and carrying dust away. Second, neutron-absorbing control rods will be used for control and emergency use. Third, the excess reactivity will be maintained at the desired minimum level by balancing the addition of fissionable material to the system with the fissionable material bleed from the system. Fourth, in the case of a blower failure, the fissionable material dust will settle out of the core, the upper piping and the cyclones into the divided lower piping where a critical mass will not exist. The divided lower piping may be surrounded with a neutron-absorbing material for further protection. Finally, dump valves will be used to remove fissionable material rapidly in the case of an emergency.

In the practice of the invention the fissionable material or fuel (these terms are used equivalently herein) may be any stable compound of uranium or plutonium containing sufficient amounts of isotopes fissionable with slow neutrons, i.e., $U^{235}$ or $Pu^{239}$, to make a critical mass. Part of the fuel may be thorium, uranium-238 and other actinide isotopes which are converted into fissionable materials by neutron absorption. Suitable compounds of the aforesaid uranium, plutonium and thorium are the oxides, fluorides, chlorides, sulfates, phosphates and the like, and mixtures or compounds of these salts with other salts of low neutron cross-section. Uranium compounds of at least 20% enrichment, i.e., 80% $U^{238}$:20% $U^{235}$, are especially preferred for use in the invention. Furthermore, it is preferred to employ an oxide of uranium of such enrichment. It is most preferred to use uranium trioxide ($UO_3$) in an oxidizing atmosphere as, for example, in an $N_2$-$O_2$ atmosphere and uranium dioxide ($UO_2$) in a reducing atmosphere.

When the apparatus of this invention is used for the production of chemicals in the coolant gas through initiation by fission fragment energy, it is desirable that the particle size of the fissionable material be maintained within narrow limits. By so controlling the particle size a large amount of the fission fragment energy will be expended in the coolant gas. Thus, if the critical mass of fissionable material exists as particles of average size much over 10 microns in diameter, most of the kinetic energy will be absorbed and converted to heat in the particle in which each fission takes place, because the slowing-down distance of the fission fragments is less than the average distance of the fissioning atom from the surface of the particle. On the other haind, if the aforesaid critical mass exists in particles of average size smaller than about 0.5 micron in diameter, the fissionable material surface is large and the probability is great that a fission fragment emerging from the particle in which fission takes place will collide with and lose most of its energy in another particle of fissionable material rather than in the gas phase. The optimum average particle size of the fissionable material for chemical production is about 5 microns in diameter.

The considerations of the preceding paragraph suggest that dilution of the fissionable material with nonfissioning solids should be kept as small as possible. The enrichment of the fissionable material with fissioning isotopes should be as high as can be justified on the basis of economics, availability and other factors. None of these limitations on particle size, dilution, and enrichment are so important if chemical reactions are not to be initiated in the gas phase, as when the reactor is to be used for power generation, plutonium production and the like.

In the preferred embodiment of FIGS. 2–5, the fissionable material removal means in the moderator zone will be more efficient at removing larger particles than smaller particles. As a result, the fine dust resulting from abrasion of the fissionable material or from particle breakdown because of energy release will tend to be concentrated in the gas leaving the cyclones and passing through the heat exchangers. The positioning of the coolant gas exit in the heat exchange circuit means that the fissionable material withdrawn for processing will be preferentially of smaller particle size, and that by reintroducing fissionable material of larger particle size the deleterious effects of dusting may be overcome and the proper average particle size may be maintained.

Suitable coolant gases for carrying the fiissionable material are (1) low neutron cross-section chemically inert gases such as helium, pure $CO_2$, pure $N_2$, and the like, (2) organic compounds such as methanol, methyl acetate, and the like, which are "dimerized" by hydrogen abstraction according to the teaching of copending application Serial No. 433,284 of Conner and Davis, filed May 28, 1954, and (3) mixtures of gases which are to be interacted by fission fragment energy such as $N_2$ and $O_2$ to give NO and $NO_2$, $CO_2$ and small amounts of $NO_2$ to give CO and $O_2$, $C_6H_6$ and $O_2$ to give $C_6H_5OH$, and the like. The term "coolant gas" as used herein is used in a broad sense to encompass all of the gases or gas mixtures referred to in this paragraph.

Suitable moderators which may be employed in the invention are the liquid or solid materials of low atomic number and low neutron absorption cross-section. Thus, solid moderators may be used such as graphite, beryllium, beryllium oxide, and so forth. When graphite is employed it is employed in the form of blocks or other desired shapes which are suitably clad with metal to prevent oxidation. As liquid moderators there may be employed light water, heavy water, terphenyl, and other polynuclear aromatic organic compounds, methanol, methyl acetate, acetonitrile and other organic compounds. These moderators may be essentially inert as in the case of graphite; they may be decomposed and recombined while acting as moderators as, for example, light water; or they may be chemically reacted by the ionization energy from gamma rays and neutrons, arising from the fission reaction taking place in the core, as, for example, when methanol is converted to ethylene glycol and formaldehyde.

When the reaction system is operated with light water as a moderator, problems with the moderator will be few assuming that the water is carefully treated to remove all potentially radioactive impurities and that a recombining catalyst is added to prevent loss of hydrogen and oxygen to the gas phase. The temperature can be allowed to rise to the boiling point and excess heat can be removed by vaporization. When organics are used as the moderator complications arise because of the decomposition and/or rearrangement reactions taking place in the moderator. The products must be isolated before they reach concentrations high enough to be seriously affected by the radioactivity.

Of the neutrons emited in fission and used to maintain the chain reaction, approximately 0.7% are emitted from 0.43 to 55.6 seconds after fission has occurred. This "delayed neutron" effect must be considered in connection with the circulation rate of the suspension of fissionable material through the system. These delayed neutrons arising from the spontaneous decay of certain fission products are useful for retaining reactor control. In the present invention the fission products will be substantially swept out of the core before many of the delayed neutrons are released. These fission products will in general be adsorbed on the surface of the particles of fissionable material (i.e., the uranium dust) and will be carried out with the fissionable material. In the preferred embodiment of the invention, FIGS. 2–5, cyclones are used to retain a substantial portion of the fissionable material completely within the moderating zone so that the delayed neutrons therefrom will be generally available for reactor control. In the simplified embodiment of the invention, FIGS. 11 and 12, some of the delayed neutrons will be released in the heat exchanger section where the biological shielding will be used to absorb them. These neutrons so absorbed will no longer be available for reactor control. However, depending on the rate of circulation through the system, some of the fissionable material containing the fission products will be returned to the gas circuits within the moderating zone before the delayed neutrons are released. There will therefore be certain optimum circulation rates which will release desirably large numbers of delayed neutrons within the moderating zone and operation of the simplified reaction system will preferably be done at such circulation rates.

In accordance with this invention, the gas velocities will be kept high enough (usually over 5 feet per second) so that the fissionable material will be thoroughly and continually mixed in the gas stream and will be carried with the stream. The term "turbulent flow" is used herein to describe this condition. Obviously, the fissionable material separation means referred to in connection with the preferred embodiment of this invention will cause segregation of solids from the main gas stream; elsewhere in the gas circuits, turbulent flow conditions will prevail.

The following two factors must be considered in choosing the coolant temperature if the reactor is being used for the purpose of power production and chemical production in the reactor core by the use of fission energy. Only the second of these factors need be considered when the reactor is being used solely for power products. First, the temperature should be low enough that the desired product of the chemical reaction, for example, the NO and $NO_2$ where $N_2$ and $O_2$ are reacted together, will be stable. The desired products in this case are NO and $NO_2$, with the later decreasing in stability as the temperature rises. Harteck et al., Nucleanics 14, 22, concluded that 300° C. was the upper limit for successful direct preparation of $NO_2$. NO is also thermodynamically unstable but the equilibrium becomes more favorable as the temperature is increased. However, an excessive temperature of about 2000° C. is necessary to obtain 2% in equilibrium with air. The favorable aspect is that the decomposition of NO is rate-limited and slow below about 800° C. in the absence of catalysts. Iron and nickel are active catalysts but chromium inhibits much of this catalytic effect. Therefore, temperatures up to 800° C. may be employed so far as this particular factor is concerned. The second consideration in selecting the coolant temperature is the stability of materials of construction in regard to dimensional change, erosion and corrosion. Conventional reactors with fixed fuel elements are limited because the elements may warp, melt or undergo phase changes. Also, reactors having liquid coolants are limited because of pressure build-up or corrosive attack above a certain temperature. In other reactors using natural uranium, neutron economy dictates using materials such as aluminum or magnesium which have low melting points as well as low cross-sections. The instant reaction system is especially advantageous in reducing the importance of all of these temperature limitations because chrome steel can be the chief material of construction and because the powdered fuel is suspended in a noncorrosive gas.

The gas pressures employed in this invention will preferably be in the range of 1–20 atmospheres, absolute pressure. The upper limit of pressure is set by the strength of materials of construction. At lower pressures the heat capacity per unit volume of gas decreases and higher circulation rates are necessary to remove equivalent amounts of fission heat. When chemical reactions are induced by fission fragment energy, pressure (and concurrent gas density) may sometimes affect the yield of desirable products. The optimum operating pressure will be determined by consideration of these and other factors.

In accordance with this invention it has been found that many of the problems associated with the use of conventional nuclear reactors for power generation can be overcome. In addition, this neutronic reaction system described herein provides an opportunity for making use of a majority of the fission fragment energy released in the nuclear fission to initiate the direct synthesis of important and valuable chemical compounds. Also, it makes possible the economical utilization of gamma rays and other reactor radiations to initiate desirable chemical reactions in the moderator zone of the system when a liquid organic compound is employed as the moderator.

The fact that the fissionable material is a powder means that a compound such as uranium oxide may be used in place of the more expensive uranium metal in fixed fuel element reactors. Additional savings result from elimination of the expensive steps of converting uranium oxide to metal and of fabricating the metal into fuel elements as well as from elimination of expensive carefully machined channels and other devices for supporting fixed fuel elements in exact geometry within the reactor core. The fact that the coolant gas is not present in sufficient quantities to produce significant amounts of neutron moderation means that moderation is accomplished exteriorly to the fissionable material as in a heterogeneous reactor. Only fast and slow neutrons are ever in the core in significant quantities. Intermediate speed neutrons will not be present and hence the problem of resonance capture of neutrons of intermediate speed by $U^{238}$ is avoided. This new neutronic reaction retains the features of good control and safe operation which are characteristic of slow neutron reactors in comparison with fast neutron reactors.

The elimination of fixed fuel elements and of liquid carriers results in a significant increase in allowable operating temperature for this neutronic reaction system as compared with most conventional reactors. In fact, when inert gases are used the limitation on operating temperature is determined by the steam generation equipment itself resulting in high efficiency in converting heat into electricity. The system also involves the use of a comparatively small core and this means that comparatively high pressures may be employed with attendant improvement in heat exchange characteristics of the system.

Still a further advantage of the present invention is that extra fissionable material may easily be added to the core as necessary to overcome the poisoning effects of fission products. The result is feasible operation to fuel burnups exceeding those of conventional fixed fuel element reactors. At the same time fissionable material may be withdrawn from the system as necessary and processed to remove fission product poisons. It may also be processed to remove desired products. In addition, fission product gases which constitute an important part of the reactor poisons can be continuously purged and thus eliminated from the system.

The present invention is particularly suited for producing steam, electricity and chemicals with improvements in operating economics as compared with conventional reactors.

What I claim and desire to protect by Letters Patent is:

1. A neutronic reaction system comprising (a) a reactor core containing a critical mass of fissionable material suspended as a powder in a coolant gas, said reactor core being characterized in that there is substantially no moderation within the reactor core of fast neutrons resulting from the fissioning of said fissionable material, (b) a moderator substantially surrounding the reactor core, said reactor core having a horizontal cross-section at the midpoint of its vertical axis and elsewhere along its vertical axis showing no more than one external bounding surface between said fissionable material and said moderator, (c) a plurality of heat exchangers located exteriorly of the reactor core and moderator, (d) conduit means connecting the reactor core with each heat exchanger for the passage of the suspension of fissionable material from the reactor core to the heat exchangers, (e) return conduit means from each heat exchanger to the reactor core for returning the suspension of fissionable material from the heat exchanger to the reactor core, (f) means in each reactor core-heat exchanger circuit in which the suspension of fissionable material is circulated for continuously cycling the suspension of fissionable material therein and throughout the system, (g) means for addition of fissionable material and coolant gas to the system, and (h) means for removal of fissionable material and fission products from the system.

2. A neutronic reaction system comprising (a) a reactor core containing a critical mass of fissionable material suspended as a powder in a coolant gas, said reactor core being characterized in that there is substantially no moderation within the reactor core of fast neutrons resulting from the fissioning of said fissionable material, (b) a solid moderator substantially surrounding the reactor core, said reactor core having a horizontal cross-section at the midpoint of its vertical axis and elsewhere along its vertical axis showing no more than one external bounding surface between said fissionable material and said moderator, (c) a plurality of heat exchangers located exteriorly of the reactor core and solid moderator, (d) conduit means connecting the reactor core with each heat exchanger for the passage of the suspension of fissionable material from the reactor core to the heat exchangers, (e) return conduit means from each heat exchanger to the reactor core for returning the suspension of fissionable material from the heat exchanger to the reactor core, (f) means in each reactor core-heat exchanger circuit in which the suspension of fissionable material is circulated for continuously cycling the suspension of fissionable material therein and throughout the system, (g) means for addition of fissionable material and coolant gas to the system, and (h) means for removal of fissionable material and fission products from the system.

3. A neutronic reaction system comprising (a) a reactor core containing a critical mass of fissionable material suspended as a powder in a coolant gas, said reactor core being characterized in that there is substantially no moderation within the reactor core of fast neutrons resulting from the fissioning of said fissionable material, (b) a reactor tank substantially enclosing the reactor core and containing (c) a liquid moderator which substantially surrounds the reactor core, said reactor core having a horizontal cross-section at the midpoint of its vertical axis and elsewhere along its vertical axis showing no more than one external bounding surface between said fissionable material and said moderator, (d) a plurality of heat exchangers located exteriorly of the reactor tank, (e) conduit means connecting the reactor core with each heat exchanger for the passage of the suspension of fissionable material from the reactor core to the heat exchangers, (f) return conduit means from each heat exchanger to the reactor core for returning the suspension of fissionable material from the heat exchanger to the reactor core, (g) means in each reactor core-heat exchanger circuit in which the suspension of fissionable material is circulated for continuously cycling the suspension of fissionable material therein and throughout the system, (h) means for addition of fissionable material and coolant gas to the system, and (i) means for removal of fissionable material and fission products from the system.

4. A neutronic reaction system comprising (a) a unitary reactor core containing a critical mass of fissionable material suspended as a powder in a coolant gas, said core being characterized in that there is substantially no moderation within the core of fast neutrons resulting from the fissioning of said fissionable material, (b) a moderator substantially surrounding the reactor core, (c) a plurality of fissionable material removal means located exteriorly of the reactor core but within the moderator, (d) a plurality of heat exchangers located exteriorly of the reactor core and moderator, (e) conduit means connecting the reactor core with each of said fissionable material removal means for the passage of the suspension of fissionable material from the reactor core to the fissionable material removal means, (f) conduit means from each of said fissionable material removal means to at least one of said heat exchangers for the passage of coolant gas from which fissionable material has been removed to said heat exchanger, there being at least one such conduit means communicating with each heat exchanger, (g) return conduit means from each heat exchanger to the reactor core for returning the coolant gas from each heat exchanger along with the fissionable material previously separated therefrom in the fissionable material removal means back to the reactor core, (h) means in each reactor core-heat exchanger circuit in which coolant gas is circulated for continuously cycling said coolant gas therein and throughout the system, (i) means for the addition of fissionable material and coolant gas to the system and (j) means for the removal of fissionable material and fission products from the system.

5. A neutronic reaction system comprising (a) a unitary reactor core containing a critical mass of fissionable material suspended as a powder in a coolant gas, said core being characterized in that there is substantially no moderation within the core of fast neutrons resulting from the fissioning of said fissionable material, (b) a solid moderator substantially surrounding the reactor core, (c) a plurality of fissionable material removal means located exteriorly of the reactor core but within the solid moderator, (d) a plurality of heat exchangers located exteriorly of and around the reactor core and solid moderator, (e) conduit means connecting the reactor core with each of said fissionable material removal means for the passage of the suspension of fissionable material from the reactor core to the fissionable material removal means, (f) conduit means from each of said fissionable material removal means to at least one of said heat exchangers for the passage of coolant gas from which fissionable material has been removed to said heat exchanger, there being at least one such conduit means communicating with each heat exchanger, (g) return conduit means from each heat exchanger to the reactor core for returning the coolant gas from each heat exchanger along with the fissionable material previously separated therefrom in the fissionable material removal means back to the reactor core, (h) means in each reactor core-heat exchanger circuit in which coolant gas is circulated for continuously cycling said coolant gas therein and throughout the system, (i) means for the addition of fissionable material and coolant gas to the system, and (j) means for the removal of fissionable material and fission products from the system.

6. A neutronic reaction system comprising (a) a unitary reactor core containing a critical mass of fissionable material suspended as a powder in a coolant gas, said core being characterized in that there is substantially no moderation within the core of fast neutrons resulting from the fissioning of said fissionable material, (b) a reactor tank substantially enclosing the reactor core and containing (c) a liquid moderator which substantially surrounds the reactor core, (d) a plurality of fissionable material removal means located exteriorly of the reactor core but within the reactor tank, (e) a plurality of heat exchangers located exteriorly of the reactor tank, (f) conduit means connecting the reactor core with each of said fissionable material removal means for the passage of the suspension of fissionable material from the reactor core to the fissionable material removal means, (g) conduit means from each of said fissionable material removal means to at least one of said heat exchangers for the passage of coolant gas from which fissionable material has been removed to said heat exchanger, there being at least one such conduit means communicating with each heat exchanger, (h) return conduit means from each heat exchanger to the reactor core for returning the coolant gas from each heat exchanger along with the fissionable material previously separated therefrom in the fissionable material removal means back to the reactor core, (i) means in each reactor core-heat exchanger circuit in which coolant gas is circulated for continuously cycling said coolant gas therein and throughout the system, (j) means for the addition of fissionable material and coolant gas to the system, and (k) means for the removal of fissionable material and fission products from the system.

7. The apparatus of claim 4 wherein cyclones are employed as the fissionable material removal means.

8. The apparatus of claim 7 wherein there are venturis in each return conduit means from each heat exchanger to the reactor core and the solids exits from the cyclones are in communication therewith.

9. The apparatus of claim 4 wherein the reactor core is divided into a plurality of vertical sections.

10. The apparatus of claim 4 wherein the reactor core is in the form of an annulus with the critical mass of suspended fissionable material in said annulus.

11. The apparatus of claim 1 wherein the reactor core is divided into a plurality of vertical sections.

12. The apparatus of claim 1 wherein the reactor core is in the form of an annulus with the critical mass of suspended fissionable material in said annulus.

13. A method of producing a controllable slow neutron chain reaction which comprises continuously forming in a fission zone a critical mass of fissionable material, said fissionable material being suspended as a powder in a coolant gas, continuously moderating the fast neutrons formed in the fission zone by use of a moderator in a moderating zone substantially surrounding the fission zone, continuously withdrawing a plurality of streams of suspended fissionable material from the fission zone, continuously removing substantially the fissionable material from each of said streams within the moderating zone but outside of the fission zone, continuously subjecting each of said streams from which fissionable material has been removed to heat exchange in one of a plurality of heat exchange zones where energy from the fission is removed as heat, the conditions in each heat exchange zone being such that a critical mass of fissionable material does not exist therein during operation of the process, and continuously recycling the coolant gas from each heat exchange zone along with fissionable material previously separated therefrom in said removal step back to the fission zone, said fissionable material powder while in said fission zone being continuously moved with the coolant gas through the zone at substantially the velocity of the coolant gas.

14. The process of claim 13 wherein a liquid moderator is employed in the moderating zone.

15. The process of claim 14 wherein the liquid moderator is an organic liquid.

16. The process of claim 15 wherein the fissionable material is a uranium compound.

17. The process of claim 16 wherein the uranium in the uranium compound is uranium of at least 20% enrichment as respects its $U^{235}$ content.

18. The process of claim 17 wherein the uranium compound is a uranium oxide.

19. The process of claim 18 wherein the average particle size of the uranium oxide powder is in the range of from about 0.5 micron to about 10 microns.

20. The process of claim 15 wherein the fissionable material is a compound of plutonium.

21. The process of claim 13 wherein the coolant gas is a mixture of gases which react under the influence of fission fragment energy and wherein said mixture of gases does in fact react in the fission zone of the process.

22. The process of claim 21 wherein a portion of the coolant gas from at least one of the heat exchange zones is removed and treated to remove reaction products and the unreacted gases are recycled to the process.

23. The process of claim 21 wherein the coolant gas is a mixture of $N_2$ and $O_2$.

24. The process of claim 13 wherein the coolant gas is a low neutron cross-section inert gas.

25. The process of claim 13 wherein the coolant gas is an organic compound which may be dimerized by hydrogen abstraction under the influence of fission fragment energy and wherein said organic compound does in fact dimerize by hydrogen abstraction in the fission zone of the process.

26. The process of claim 13 wherein a solid moderator is employed.

27. The process of claim 13 wherein the average particle size of the fissionable material powder is in the range of from about 0.5 micron to about 10 microns.

References Cited in the file of this patent

UNITED STATES PATENTS

| 2,898,277 | Harteck et al. | Aug. 4, 1959 |
| 2,928,780 | Harteck et al. | Mar. 15, 1960 |

FOREIGN PATENTS

| 697,601 | Great Britain | Sept. 23, 1953 |
| 708,901 | Great Britain | May 12, 1954 |
| 749,064 | Great Britain | May 16, 1956 |

OTHER REFERENCES

RM–1835 (Rand), The Criticality and Some Potentialities of "Cavity" Reactors (Abridged), George Safonov, July 17, 1955, Rand Corp., Santa Monica, California.

Nuclear Science Abstracts, volume 11, No. 13, July 15, 1957, Abstract No. 6908.

Nuclear Science Abstracts, volume 10, Abstract No. 4409, 1956.

(Other references on following page)

OTHER REFERENCES

Proceedings of the International Conference on the Peaceful Uses of Atomic Energy, vol. III, Geneva, August 8–20, 1955, United Nations, New York, 1956, pp. 121–124.

Atomic Energy Commission Document: CP–445, Low Density $UO_2$ Pile, Ibser, February 24, 1943, 6 pages.

Proceedings of the International Conference on the Peaceful Uses of Atomic Energy, vol. III, Geneva, August 8–20, 1955, United Nations, New York, 1956, pages 100 and 212.

Atomic Energy Commission Document LRL–86, Dissociation Cooling, a Discussion. Received in Scientific Library October 8, 1954, p. 5.

Goodman: The Science and Engineering of Nuclear Power, vol. II. Addison-Wesley Press, 1949, pp. 123–127.

Glasstone: Principles of Nuclear Reactor Engineering, D. Van Nostrand Co., Inc., 1955, pp. 206 and 485–501.

TID–5275 Research Reactors, pages 312, 315–317.

Nucleonics, vol. 12, No. 9, September 1954, pages 18, 19.